United States Patent
Lim

(10) Patent No.: US 10,086,834 B2
(45) Date of Patent: Oct. 2, 2018

(54) LANE KEEPING ASSIST/SUPPORT SYSTEM, VEHICLE INCLUDING THE SAME, AND METHOD FOR CONTROLLING THE SAME

(71) Applicant: Hyundai Motor Company, Seoul (KR)

(72) Inventor: Seong Woong Lim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 125 days.

(21) Appl. No.: 15/184,140

(22) Filed: Jun. 16, 2016

(65) Prior Publication Data

US 2017/0166206 A1 Jun. 15, 2017

(30) Foreign Application Priority Data

Dec. 15, 2015 (KR) ........................ 10-2015-0179088

(51) Int. Cl.
| | | |
|---|---|---|
| *A01B 69/00* | (2006.01) | |
| *B62D 6/00* | (2006.01) | |
| *B62D 11/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 19/00* | (2018.01) | |

(Continued)

(52) U.S. Cl.
CPC ......... *B60W 30/12* (2013.01); *G06K 9/00791* (2013.01); *G06K 9/00798* (2013.01); *B60W 2420/42* (2013.01); *B60W 2550/30* (2013.01)

(58) Field of Classification Search
None
See application file for complete search history.

(56) References Cited

U.S. PATENT DOCUMENTS

| | | | | |
|---|---|---|---|---|
| 7,657,354 B2 * | 2/2010 | Breed | ................... | B60R 21/013 180/271 |
| 9,180,890 B2 * | 11/2015 | Lu | ..................... | B60W 50/0098 |
| 9,487,139 B1 * | 11/2016 | Ishida | ................... | B60W 50/14 |

(Continued)

FOREIGN PATENT DOCUMENTS

| | | |
|---|---|---|
| JP | 2004-038858 A | 2/2004 |
| JP | 2009-208602 A | 9/2009 |

(Continued)

*Primary Examiner* — Anne M Antonucci
*Assistant Examiner* — Kenny A. Taveras
(74) *Attorney, Agent, or Firm* — Mintz Levin Cohn Ferris Glovsky and Popeo, P.C.; Peter F. Corless

(57) ABSTRACT

A lane keeping assist/support (LKAS) system for preventing lane departure of a vehicle includes: an LKAS controller determining whether an adjacent vehicle is present by analyzing around-view images of the vehicle acquired by an around-view monitoring (AVM) system; a vehicle position calculator calculating a position of the vehicle; an adjacent vehicle position calculator calculating a position of the adjacent vehicle; a torque controller determining whether a proximity index generated according to the calculated position of the vehicle and the calculated position of the adjacent vehicle is less than a threshold value and correcting an initial torque timing and an initial torque based on the calculated position of the vehicle when the proximity index is less than the threshold value; and a steering apparatus controlling steering of the vehicle according to the corrected initial torque timing and the corrected initial torque.

17 Claims, 4 Drawing Sheets

(51) Int. Cl.
  *B60W 30/12* (2006.01)
  *G06K 9/00* (2006.01)

(56) References Cited

U.S. PATENT DOCUMENTS

| | | | | |
|---|---|---|---|---|
| 9,620,018 B2* | 4/2017 | Won | ............. | G08G 1/167 |
| 9,669,840 B2* | 6/2017 | Paszkowicz | ......... | B60W 40/08 |
| 9,720,085 B2* | 8/2017 | Schneider | ............ | G01S 15/931 |
| 9,809,251 B2* | 11/2017 | Yamaoka | ............ | B62D 15/025 |
| 2005/0273261 A1* | 12/2005 | Niwa | .................... | B60W 50/14 |
| | | | | 701/301 |
| 2011/0118939 A1* | 5/2011 | Kawamata | ............ | B60W 10/06 |
| | | | | 701/41 |
| 2012/0215377 A1* | 8/2012 | Takemura | ............ | B60W 30/12 |
| | | | | 701/1 |
| 2012/0283912 A1* | 11/2012 | Lee | .................... | B62D 1/286 |
| | | | | 701/41 |
| 2013/0024103 A1* | 1/2013 | Schneider | ............ | B60W 40/04 |
| | | | | 701/301 |
| 2013/0049988 A1* | 2/2013 | Roeber | ............. | G08G 1/09623 |
| | | | | 340/905 |
| 2013/0063601 A1* | 3/2013 | Wakabayashi | ............ | B60R 1/00 |
| | | | | 348/148 |
| 2013/0274985 A1* | 10/2013 | Lee | .................... | B60W 10/20 |
| | | | | 701/23 |
| 2013/0314503 A1* | 11/2013 | Nix | .................... | G06K 9/00805 |
| | | | | 348/46 |
| 2014/0035738 A1* | 2/2014 | Kim | .................... | G08G 1/167 |
| | | | | 340/435 |
| 2014/0188360 A1* | 7/2014 | Lee | .................... | G08G 1/167 |
| | | | | 701/70 |
| 2014/0188366 A1* | 7/2014 | Shin | .................... | G08G 1/167 |
| | | | | 701/96 |
| 2014/0257659 A1* | 9/2014 | Dariush | ............... | G08G 1/166 |
| | | | | 701/70 |
| 2015/0051752 A1* | 2/2015 | Paszkowicz | ......... | B60W 50/08 |
| | | | | 701/1 |
| 2015/0175159 A1* | 6/2015 | Gussner | ............ | B62D 15/0265 |
| | | | | 701/1 |
| 2015/0203114 A1* | 7/2015 | Fritsch | .................. | B60W 30/12 |
| | | | | 701/466 |
| 2015/0278610 A1* | 10/2015 | Renner | ............. | G06K 9/00798 |
| | | | | 340/435 |
| 2016/0009282 A1* | 1/2016 | Tokimasa | ............... | B60W 30/16 |
| | | | | 701/96 |
| 2016/0107597 A1* | 4/2016 | Won | .................... | G08G 1/167 |
| | | | | 340/439 |
| 2016/0176400 A1* | 6/2016 | Nakano | ................ | B62D 15/025 |
| | | | | 701/41 |
| 2016/0185388 A1* | 6/2016 | Sim | .................... | B62D 15/0255 |
| | | | | 701/41 |
| 2016/0221604 A1* | 8/2016 | Yamaoka | ............. | B62D 15/025 |
| 2016/0231746 A1* | 8/2016 | Hazelton | ............. | G05D 1/0212 |
| 2016/0278065 A1* | 9/2016 | Kim | .................... | H04W 72/046 |
| 2016/0280264 A1* | 9/2016 | Baek | ................... | B62D 15/0255 |
| 2017/0029025 A1* | 2/2017 | Kim | ........................ | B62D 6/10 |
| 2017/0057475 A1* | 3/2017 | Lim | ........................ | B60T 7/22 |
| 2017/0057503 A1* | 3/2017 | Cho | ........................ | B60W 30/12 |
| 2017/0129489 A1* | 5/2017 | Pawlicki | ............... | B60W 30/18 |
| 2017/0148327 A1* | 5/2017 | Sim | ........................ | G08G 1/167 |
| 2017/0166206 A1* | 6/2017 | Lim | ........................ | B60W 30/12 |
| 2017/0169627 A1* | 6/2017 | Kim | ........................ | G07C 5/0808 |
| 2017/0240185 A1* | 8/2017 | Li | ........................ | B60W 30/12 |
| 2017/0253181 A1* | 9/2017 | Choi | ..................... | B60Q 9/008 |
| 2017/0293198 A1* | 10/2017 | Kim | ..................... | G02F 1/29 |
| 2017/0293199 A1* | 10/2017 | Kim | ..................... | H04N 5/2252 |

FOREIGN PATENT DOCUMENTS

| | | |
|---|---|---|
| JP | 2009539681 A | 11/2009 |
| JP | 2012232704 A | 11/2012 |
| JP | 2013-154710 A | 8/2013 |
| KR | 2011-0054144 A | 5/2011 |
| KR | 2014-0016510 A | 2/2014 |
| KR | 2014-0076021 A | 6/2014 |
| KR | 10-2014-0084960 A | 7/2014 |
| KR | 10-2015-0128066 A | 11/2015 |

* cited by examiner

LANE KEEPING ASSIST/SUPPORT SYSTEM, VEHICLE INCLUDING THE SAME, AND METHOD FOR CONTROLLING THE SAME

DISCLOSURE CROSS-REFERENCE TO RELATED APPLICATION

This application claims the benefit of and priority to Korean Patent Application No. 10-2015-0179088, filed on Dec. 15, 2015, which is hereby incorporated by reference in its entirety as if fully set forth herein.

BACKGROUND OF THE DISCLOSURE

Technical Field

The present disclosure relates generally to a lane keeping assist/support (LKAS) system, a vehicle including the same, and a method for controlling the same and, more specifically, an LKAS system, a vehicle including the same, and a method for controlling the same that supports safe driving by detecting driver attentiveness.

Discussion of the Related Art

Recently, systems for improving driver and passenger posture and driving stability have been developed. Examples include the antilock brake system (ABS) which controls brake oil pressure during braking to improve vehicle stability while overcoming limitations in simple braking, the traction control system (TCS) which controls engine power in order to prevent excessive slip in case of sudden unintended acceleration or rapid acceleration, and the electronic stability program (ESP) which safely maintains a vehicle traveling direction intended by a driver under any condition by minimizing a difference between the vehicle traveling direction intended by the driver and an actual vehicle traveling direction.

In addition, a lane keeping assist/support (LKAS) system for preventing lane departure of a vehicle has been developed and commercialized as an assistive apparatus for supporting safe driving by detecting driver attentiveness. To assist a driver in steering the vehicle and to prevent fatal accidents caused by lane departure, the LKAS system controls the vehicle to keep within a lane in which the vehicle is traveling by applying a torque to a steering apparatus using a steering actuator upon determining that lane departure will occur. For example, the LKAS system can control a vehicle being driven by calculating information about traveling directions of the vehicle and information based on theoretically presumed steering and based on a vehicle model according to lane information provided as an image, and then feeding back the calculated information.

However, since the LKAS control is implemented to perform torque control irrespective of other vehicles traveling on lanes adjacent to the corresponding vehicle, the driver of the corresponding vehicle may feel uncomfortable about the LKAS control when the vehicle is traveling in a lane adjacent to lanes in which other vehicles are traveling. Such uncomfortableness may deteriorate the experience of using the LKAS system. Therefore, it is necessary to improve performance of the LKAS system.

SUMMARY OF THE DISCLOSURE

An object of the present disclosure devised to solve the problem lies in an LKAS system which performs torque control in consideration of positions of adjacent vehicles such that a driver does not feel uncomfortable during torque control, a vehicle including the same, and a method of controlling the same.

The technical problems solved by the present disclosure are not limited to the above technical problems and those skilled in the art may understand other technical problems from the following description.

According to embodiments of the present disclosure, a lane keeping assist/support (LKAS) system for preventing lane departure of a vehicle includes: an LKAS controller determining whether an adjacent vehicle is present by analyzing around-view images of the vehicle acquired by an around-view monitoring (AVM) system installed in the vehicle; a vehicle position calculator calculating a position of the vehicle; an adjacent vehicle position calculator calculating a position of the adjacent vehicle when the adjacent vehicle is determined to be present; a torque controller determining whether a proximity index generated according to the calculated position of the vehicle and the calculated position of the adjacent vehicle is less than a threshold value and correcting an initial torque timing and an initial torque based on the calculated position of the vehicle when the proximity index is determined to be less than the threshold value; and a steering apparatus controlling steering of the vehicle according to the corrected initial torque timing and the corrected initial torque.

Furthermore, according to embodiments of the present disclosure, a vehicle includes the LKAS system as described above.

Furthermore, according to embodiments of the present disclosure, a method of controlling an LKAS system for preventing lane departure of a vehicle includes: determining whether an adjacent vehicle is present by analyzing around-view images of the vehicle acquired by an AVM system installed in the vehicle; calculating a position of the vehicle; calculating a position of the adjacent vehicle when the adjacent vehicle is determined to be present; determining whether a proximity index generated according to the calculated position of the vehicle and the calculated position of the adjacent vehicle is less than a threshold value; correcting an initial torque timing and an initial torque based on the calculated position of the vehicle when the proximity index is determined to be less than the threshold value; and controlling steering of the vehicle according to the corrected initial torque timing and the corrected initial torque.

The LKAS system, the vehicle including the same, and the method of controlling the same according to embodiments of the present disclosure may improve the quality of experience of the vehicle by varying a torque control timing and a torque control quantity according to presence or absence of an adjacent vehicle and a distance between the vehicle and the adjacent vehicle such that the driver of the vehicle does not feel uncomfortable about LKAS control when the adjacent vehicle is present around the vehicle.

The effects of the present disclosure are not limited to the above-described effects, and other effects which are not described herein will become apparent to those skilled in the art from the following description.

DETAILED DESCRIPTION OF THE EMBODIMENTS

Reference will now be made in detail to the embodiments of the present disclosure, examples of which are illustrated in the accompanying drawings. The terminology used herein is for the purpose of describing particular embodiments only and is not intended to be limiting of the disclosure. Although the suffixes "module" and "unit" are used for constituent elements described in the following description, this is intended only for ease of description of the specification.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 1:
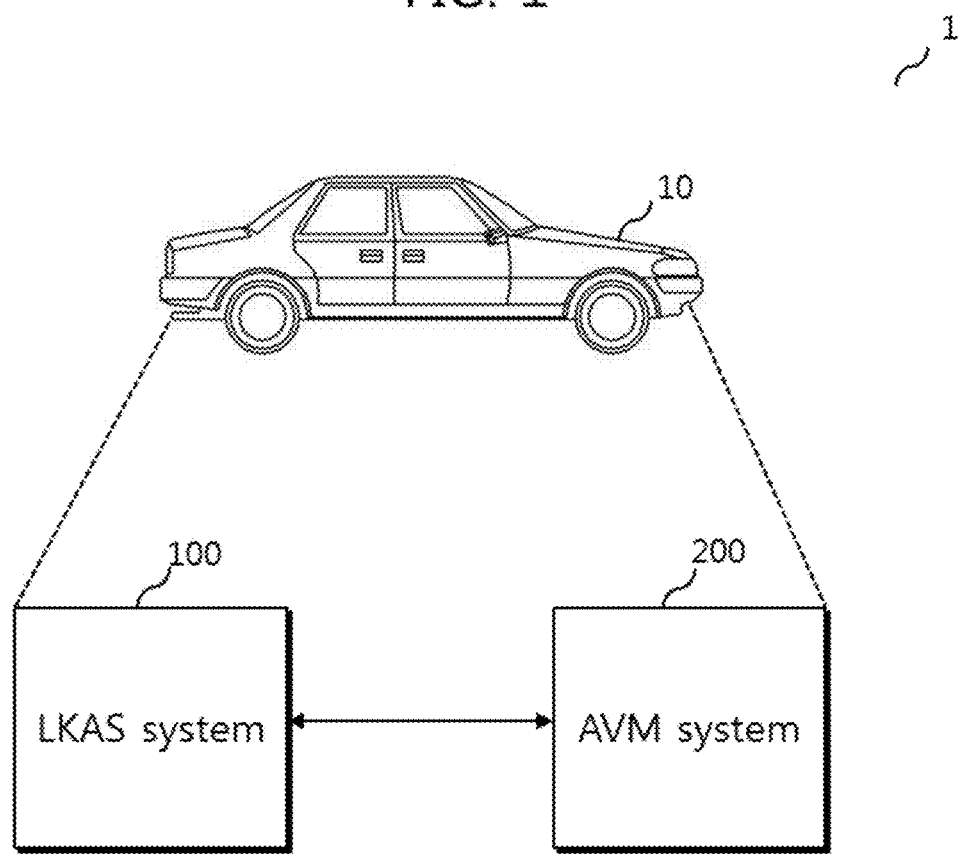
FIG. 1 illustrates a vehicle according to embodiments of the present disclosure.

Referring now to the presently disclosed embodiments, FIG. 1 illustrates a vehicle according to embodiments of the present disclosure.

As shown in FIG. 1, a vehicle 10 may include a lane keeping assist/support (LKAS) system 100 and an around-view monitoring (AVM) system 200 installed therein.

The LKAS system 100 is an assistive apparatus for supporting safe driving by sensing driver attentiveness. To prevent lane departure of the vehicle 10, the LKAS system 100 may control the driving of the vehicle to keep the current lane in which the vehicle is traveling by applying a torque to a steering apparatus upon determining that lane departure will occur. The LKAS system 100 detects lane departure on the basis of images photographed by a camera provided to the front of the vehicle 10. In addition, the LKAS system 100 may detect the position of a vehicle which is traveling in an adjacent lane and use the detected position for torque control with respect to the steering apparatus. The LKAS system 100 may acquire information about the adjacent vehicle which is traveling in the adjacent lane from the AVM system 200.

The AVM system 200 provides an AVM function during vehicle driving. The AVM function refers to a function of photographing around-view images of the vehicle 10 (i.e., image(s) showing the surrounding environment of the vehicle) when the vehicle 10 is parked or started and providing an image like a bird's eye view using the photographed images. The AVM system 200 may photograph around-view images of the vehicle 10 and provide the photographed images to the LKAS system 100 at the request of the LKAS system 100 even when the vehicle 10 is not parked or started.

Figure 2:
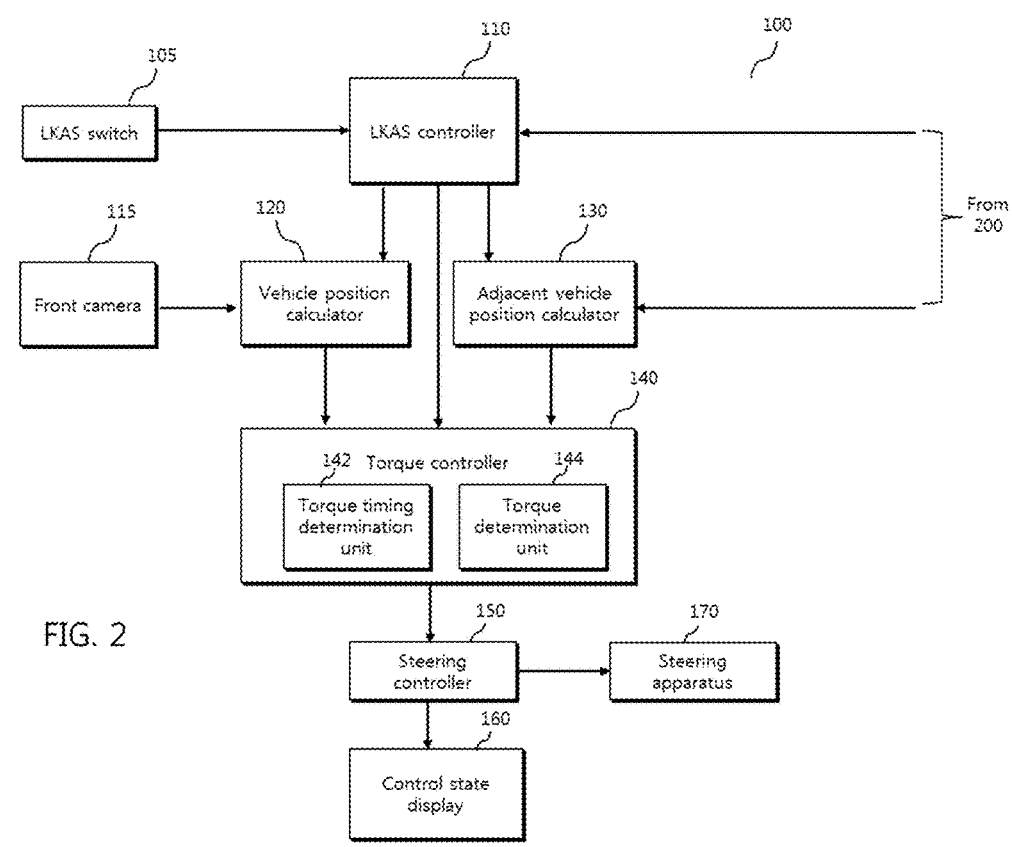
FIG. 2 is a block diagram of an LKAS system shown in FIG. 1.
Figure 3:
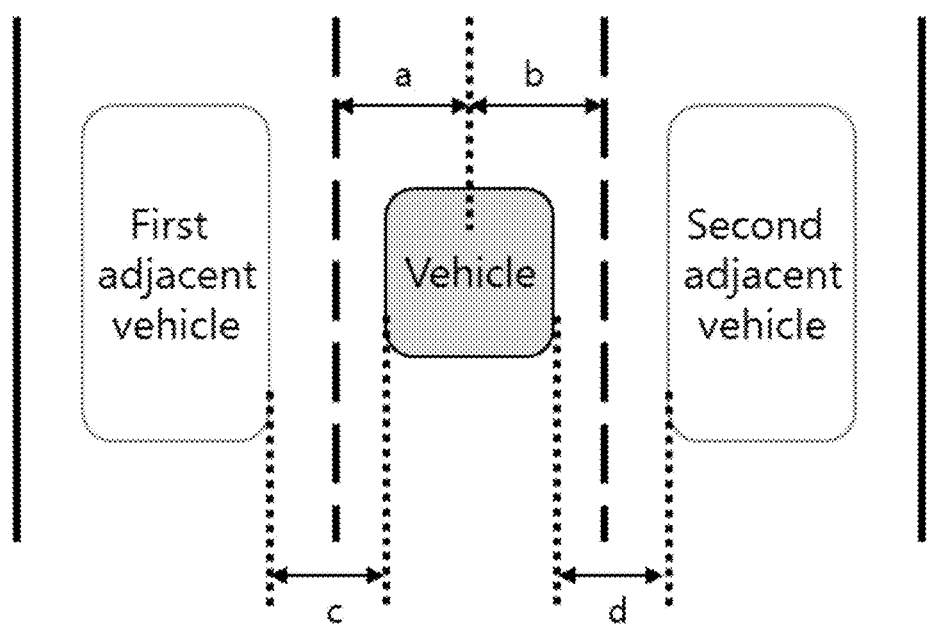
FIG. 3 illustrates the concept of a proximity index calculated by a torque controller shown in FIG. 2.

FIG. 2 is a block diagram of the LKAS system shown in FIG. 1, and FIG. 3 illustrates the concept of a proximity index calculated by a torque controller shown in FIG. 2.

As shown in FIGS. 2 and 3, the LKAS system 100 may include an LKAS switch 105, an LKAS controller 110, a front camera 115, a vehicle position calculator 120, an adjacent vehicle position calculator 130, a torque controller 140, a steering controller 150, a control state display 160, and a steering apparatus 170.

The LKAS switch 105 is an interface for receiving a control signal for activating or deactivating the LKAS function from a user and may be included as a part of a vehicle head unit (not shown). The LKAS switch 105 may receive a signal for controlling the LKAS function from the user and send the signal to the LKAS controller 110. The LKAS switch 105 may be implemented as a separate type switch or a user setting menu (USM) switch in a cluster.

The LKAS controller 110 may control the overall operation of the LKAS system 100 and may be activated or deactivated by the LKAS function control signal sent from the LKAS switch 105. When the LKAS controller 110 is activated, the LKAS controller 110 may operate the LKAS system 100 in a normal mode or a composite mode. Here, the LKAS controller 110 may request the AVM system 200 to photograph around-view images and determine an operation mode based on the around-view images.

The normal mode refers to a mode in which the position of the vehicle 10 with respect to the lane in which the vehicle 10 is traveling on the basis of only an image photographed by the front camera 115 and torque is controlled. Meanwhile, the composite mode refers to a mode in which torque is controlled in consideration of not only the image photographed by the front camera 115, but also information acquired from the around-view images.

The LKAS controller 110 may analyze the around-view images, that is, images photographed within visibility ranges of front, rear, left, and/or right cameras of the AVM system 200, enter the normal mode when an adjacent vehicle is present, and enter the composite mode when no adjacent vehicle is present.

A sequential description will be given of operation of the LKAS system 100 in the normal mode and operation of the LKAS system 100 in the composite mode.

In the normal mode, the LKAS controller 110 may activate the vehicle position calculator 120 and deactivate the adjacent vehicle position calculator 130. The vehicle position calculator 120 may detect a lane in which the vehicle 10 is traveling by analyzing a front view image photographed by the front camera 115 showing a front view of the vehicle.

For example, the vehicle position calculator 120 may detect the lane in which the vehicle 10 is traveling from the front view image in such a manner that the vehicle position calculator 120 removes noise from the front view image, generates a multi-resolution image from the noise-removed image, separates the multi-resolution image, and extracts a lane edge from the multi-resolution image while maintaining the multi-resolution image.

The vehicle position calculator 120 may calculate a distance between the detected lane in which the vehicle 10 is traveling and the center of the vehicle 10. In FIG. 3, the vehicle position calculator 120 may detect lanes located on both sides of the vehicle 10, and then calculate a first distance a between the center of the vehicle 10 and the left lane and a second distance b between the center of the vehicle 10 and the right lane. The vehicle position calculator 120 may send the calculated first and second distances a and b, respectively, to the torque controller 140.

A torque timing determination unit 142 and a torque determination unit 144 of the torque controller 140 may determine a torque timing and a torque necessary to locate the vehicle 10 at the center of the lane in which the vehicle 10 is traveling on the basis of the first distance a and the second distance b.

The torque timing refers to a torque control start timing. The torque timing may be advanced as a difference (absolute value) between the ratio of the first distance a to the second distance b and one increases and may be delayed as the difference between the ratio of the first distance a to the second distance b and one decreases. That is, the difference between the ratio of the first distance a to the second distance b and one is a value indicating how close the vehicle 10 is to the left or right lane.

The torque refers to a degree of torque applied during torque control. The torque may increase as the difference (absolute value) between the ratio of the first distance a to the second distance b and one increases and may decrease as the difference between the ratio of the first distance a to the second distance b and one decreases.

The torque timing and torque determined by the torque controller 140 are sent to the steering controller 150. The steering controller 150 outputs a signal for controlling the steering apparatus 170 according to the torque timing and the torque. In addition, the steering controller 150 may output the signal to the control state display 160.

The control state display 160 may be implemented as a display, a speaker, a haptic module of the dashboard of the vehicle 10, or the like. For example, a torque control state according to the steering controller 150 may be displayed through the display of the dashboard of the vehicle 10 and, when an emergency torque control situation is generated, a warning sound may be output through the speaker or haptic alarm may be output.

The steering apparatus 170 is a means for assisting steering of the vehicle 10 and may include at least one of an electric power steering (EPS) and a motor driven power steering (MDPS). The steering apparatus 170 may locate the vehicle 10 at the center of the lane in which the vehicle is traveling under the control of the steering controller 150.

In the composite mode, the LKAS controller 110 may activate both the vehicle position calculator 120 and the adjacent vehicle position calculator 130.

The vehicle position calculator 120 calculates the first distance a and the second distance b and delivers the first and second distances a and b to the torque controller 140, as described above.

The adjacent vehicle position calculator 130 may calculate a distance between the vehicle 10 and an adjacent vehicle traveling in proximity to the vehicle 10 according to the around-view images of the AVM system 200.

As shown in FIG. 3, when a first adjacent vehicle is traveling in the left lane of the vehicle 10 and a second adjacent vehicle is traveling in the right lane of the vehicle 10, the adjacent vehicle position calculator 130 may detect a horizontal distance between the vehicle 10 and the first or second adjacent vehicle by removing noise from the around-view images, generate a multi-resolution image from the noise-removed images, separate the multi-resolution image, and detect coordinates of the first adjacent vehicle and the second adjacent vehicle and coordinates of the vehicle 10 while maintaining the separated multi-resolution image. Here, the detected horizontal distance may include a third distance c corresponding to a horizontal distance between the vehicle 10 and the first adjacent vehicle and a fourth distance d corresponding to a horizontal distance between the vehicle 10 and the second adjacent vehicle.

If only one of the first and second adjacent vehicles is present, only the horizontal distance between the vehicle 10 and the present adjacent vehicle is calculated. The adjacent vehicle position calculator 130 may send the calculated third and fourth distances c and d to the torque controller 140.

The torque controller 140 may generate a first proximity index and a second proximity index according to the first to fourth distances a to d and may determine whether the first and second proximity indices are respectively less than first and second threshold values.

When the first and second proximity indices are respectively less than the first and second threshold values and predetermined conditions are satisfied, the torque controller 140 may correct the torque timing and torque. If the first and second proximity indices exceed the first and second threshold values and the predetermined conditions are satisfied, the torque controller 140 may determine the torque timing and torque in the same manner as the normal mode instead of correcting the torque timing and torque.

Specifically, the torque controller 140 may generate the first proximity index by subtracting the first distance a from the third distance c. Referring to FIG. 3, the result obtained by subtracting the first distance a from the third distance c corresponds to a value obtained by subtracting the width of the vehicle 10 from the distance between the left lane and the first adjacent vehicle. The width of the vehicle 10 is a constant, and thus, the result obtained by subtracting the first distance a from the third distance c becomes a value variable according to the distance between the left lane and the first adjacent vehicle. Accordingly, the first proximity index is a numerical value indicating how close the first adjacent vehicle is to the left lane.

Similarly, the torque controller 140 may generate the second proximity index by subtracting the second distance b from the fourth distance d. Referring again to FIG. 3, the result obtained by subtracting the second distance b from the fourth distance d corresponds to a value obtained by subtracting the width of the vehicle 10 from the distance between the right lane and the second adjacent vehicle. The width of the vehicle 10 is a constant, and thus, the result obtained by subtracting the second distance b from the fourth distance d becomes a value variable according to the distance between the right lane and the second adjacent vehicle. Accordingly, the second proximity index is a numerical value indicating how close the second adjacent vehicle is to the right lane.

The torque controller 140 may determine whether the first proximity index c-a is less than the first threshold value v and determine whether the second proximity index d-b is less than the second threshold value w. That is, the torque controller 140 may determine whether the first adjacent vehicle and the second adjacent vehicle are traveling excessively close to the left and right lanes.

The first threshold value v and the second threshold value w may be determined in consideration of the width of the vehicle 10, the speed of the vehicle 10, the width of the lane, and driving style of the driver and may be identical to each other. However, the scope of the present disclosure is not limited thereto.

The torque timing determination unit 142 and the torque determination unit 144 respectively determine the torque timing and the torque on the basis of the first distance a and the second distance b as in the normal mode. The torque timing and the torque determined in this manner are respectively defined as initial torque timing t1 and initial torque $\Psi 1$.

Here, the torque includes information about a torque control direction, that is, information about whether torque control is performed for the vehicle in the left direction or right direction. For example, when the torque is positive (+), the torque control direction may be the left direction. When the torque is negative (−), meanwhile, the torque control direction may be the right direction.

When the first proximity index is less than the first threshold value v and the torque control direction determined on the basis of the first distance a and the second distance b is the left direction, the torque controller 140 may control the torque timing determination unit 142 and the torque determination unit 144 to respectively correct the initial torque timing t1 and the initial torque $\Psi 1$. In this case, the torque timing determination unit 142 may perform timing correction to advance or delay the initial torque timing by a timing correction value t'. While the timing correction value t' may be inversely proportional to the first proximity index, the scope of the present disclosure is not limited thereto.

In addition, the torque timing determination unit 142 may receive a relative vertical distance of the first adjacent vehicle with respect to the vehicle 10 from the adjacent vehicle position calculator 130 and perform timing correction to advance or delay the initial torque timing by the timing correction value t' based on the relative vertical direction. The relative vertical distance is a value obtained by subtracting the Y-coordinate value of the center of the first adjacent vehicle from the Y-coordinate value of the center of the vehicle 10. The vehicle 10 precedes the first adjacent vehicle when the relative vertical distance is a positive value, and the first adjacent vehicle precedes the vehicle 10 when the relative vertical distance is a negative value.

Therefore, when the vehicle 10 precedes the first adjacent vehicle, torque control needs to be performed quickly since the first adjacent vehicle is not visible to the driver of the vehicle 10. Conversely, when the first adjacent vehicle precedes the vehicle 10, torque control may be performed slowly since the first adjacent vehicle is visible to the driver of the vehicle 10. That is, the torque timing determination unit 142 may advance the initial torque timing by the timing correction value t' when the relative vertical distance between the first adjacent vehicle and the vehicle 10 is a positive value but may delay the initial torque timing by the timing correction value t' when the relative vertical distance between the first adjacent vehicle and the vehicle 10 is a negative value.

In this case, the torque determination unit 144 may perform torque correction to increase or decrease the initial torque by a torque correction value $\Psi'$. While the torque correction value $\Psi'$ may be inversely proportional to the first proximity index, the scope of the present disclosure is not limited thereto.

In addition, the torque determination unit 144 may receive the relative vertical distance between the first adjacent vehicle and the vehicle 10 from the adjacent vehicle position calculator 130 and perform torque correction to increase or decrease the initial torque by the torque correction value $\Psi'$ according to the relative vertical distance. Therefore, when the vehicle 10 precedes the first adjacent vehicle, torque control quantity needs to be increased since the first adjacent vehicle is not visible to the driver of the vehicle 10. Conversely, when the first adjacent vehicle precedes the vehicle 10, torque control quantity needs to be decreased since the first adjacent vehicle is visible to the driver of the vehicle 10. That is, the torque determination unit 144 may increase the initial torque by the torque correction value $\Psi'$ when the relative vertical distance between the first adjacent vehicle and the vehicle 10 is a positive value and may decrease the initial torque by the torque correction value $\Psi'$ when the relative vertical distance between the first adjacent vehicle and the vehicle 10 is a negative value.

When the second proximity index is less than the second threshold value w and the torque control direction determined on the basis of the first distance a and the second distance b is the right direction, the torque controller 140 may control the torque timing determination unit 142 and the torque determination unit 144 to respectively correct the initial torque timing t1 and the initial torque $\Psi'$.

The torque timing determination unit 142 and the torque determination unit 144 respectively correct the initial torque timing t1 and the initial torque $\Psi'$ in the same manner as the aforementioned method, and thus detailed description thereof is omitted. That is, when the first proximity index is less than the first threshold value v and the torque control direction determined on the basis of the first distance a and the second distance b is the left direction (i.e., first case), or when the second proximity index is less than the second threshold value w and the torque control direction determined on the basis of the first distance a and the second distance b is the right direction (i.e., second case), the torque timing determination unit 142 and the torque determination unit 144 may respectively send a corrected torque timing t2=t1±t' and a corrected torque $\Psi 2 = \Psi 1 \pm \Psi'$, which are respectively obtained by correcting the initial torque timing t1 and the initial torque $\Psi 1$, to the steering controller 150.

Since the correction operation need not be performed in cases other than the first and second cases, the torque timing determination unit 142 and the torque determination unit 144 may respectively send the initial torque timing t1 and the initial torque $\Psi 1$ to the steering controller 150. Since operations of the steering controller 150, the control state display 160 and the steering apparatus 170 are substantially the same as in the normal mode, a detailed description thereof is omitted.

With the LKAS system according to embodiments of the present disclosure, when an adjacent vehicle is present around the vehicle 10, the torque control timing and torque control quantity may be varied according to the distance between the vehicle 10 and the adjacent vehicle such that the driver of the vehicle 10 does not feel uncomfortable about LKAS control.

Figure 4:
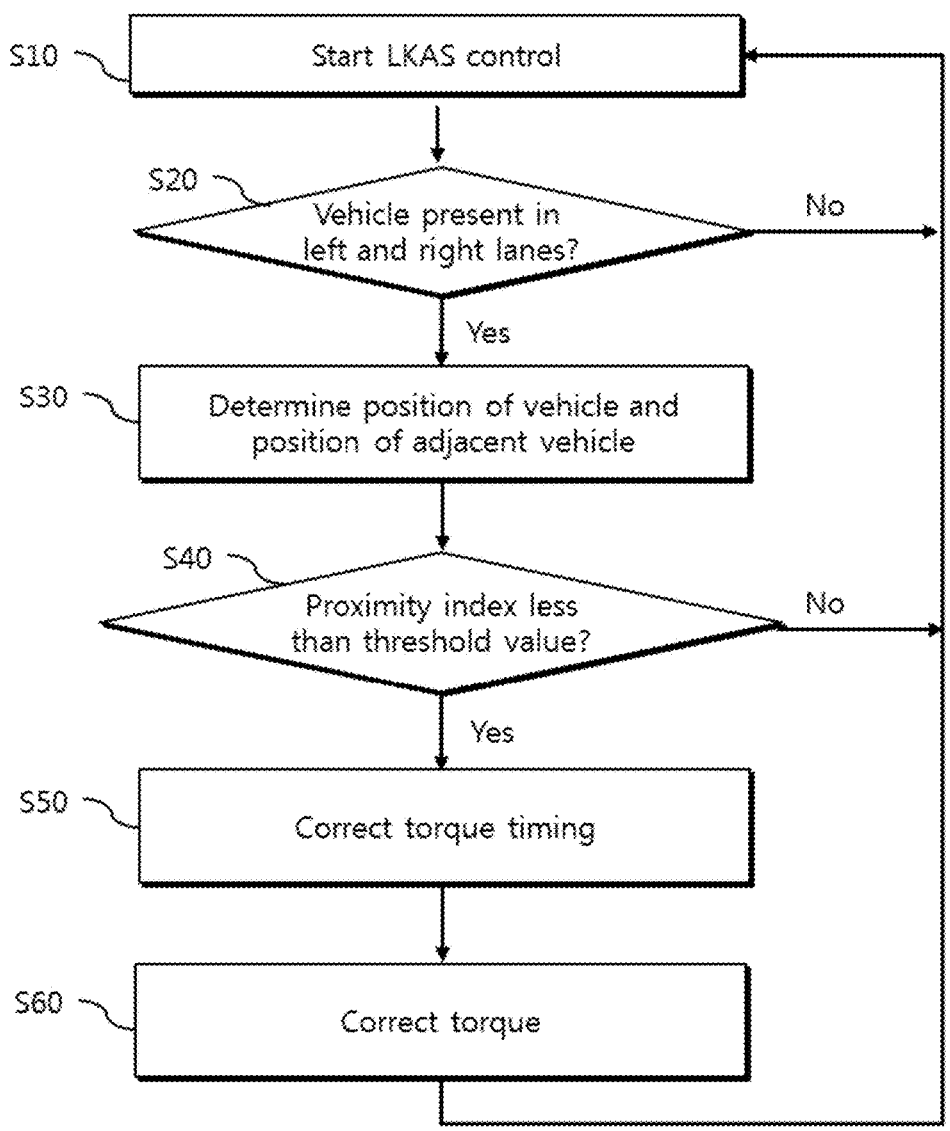
FIG. 4 is a flowchart illustrating a method of controlling the LKAS system according to embodiments of the present disclosure.

FIG. 4 is a flowchart illustrating a method of controlling the LKAS according to embodiments of the present disclosure.

As shown in FIG. 4, the LKAS controller 110 may start LKAS control by being activated by a control signal for activating the LKAS function, input through the LKAS switch 105 (S10).

The LKAS controller 110 may determine whether vehicles are present in left and right lanes adjacent to the vehicle 10 on the basis of around-view images received from the AVM system 200 (S20).

When no adjacent vehicle is present in the left and right lanes (No of S20), the LKAS controller 110 operates the LKAS system 100 in the normal mode. The normal mode operation has been described with reference to FIGS. 2 and 3.

On the other hand, when adjacent vehicles are present in the left and right lanes (Yes of S20), the LKAS controller 110 operates the LKAS system 100 in the composite mode and may activate both the vehicle position calculator 120 and the adjacent vehicle position calculator 130.

The vehicle position calculator 120 may calculate the first distance a and the second distance b corresponding to information about the position of the vehicle 10, and the adjacent vehicle position calculator 130 may calculate the third distance c and the fourth distance d corresponding to information about the positions of adjacent vehicles (i.e., a first adjacent vehicle and second adjacent vehicle) (S30).

The torque controller 140 may generate the first proximity index and the second proximity index based on the first to fourth distances a to d and determine whether the first proximity index and the second proximity index are respectively less than the first threshold value and the second threshold value. When the first proximity index and the second proximity index are respectively less than the first threshold value and the second threshold value, the torque controller 140 may correct the torque timing and torque. When the first proximity index and the second proximity index respectively exceed the first threshold value and the second threshold value, the torque controller 140 may determine the torque timing and torque in the same manner as the normal mode instead of correcting the torque timing and torque.

The torque controller 140 may generate the first proximity index and the second proximity index on the basis of the first to fourth distances a to d and determine whether the first proximity index and the second proximity index are respectively less than the first threshold value and the second threshold value (S40).

When the first proximity index is less than the first threshold value v and a torque control direction determined on the basis of the first distance a and the second distance b is the left direction and in cases other than a case in which the second proximity index is less than the second threshold value w and the torque control direction determined on the basis of the first distance a and the second distance b is the right direction (No of S40), the torque timing determination unit 142 and the torque determination unit 144 may respectively send the initial torque timing t1 and the initial torque $\Psi 1$ to the steering controller 150 as in the normal mode.

When the first proximity index is less than the first threshold value v and a torque control direction determined on the basis of the first distance a and the second distance b is the left direction or when the second proximity index is less than the second threshold value w and the torque control direction determined on the basis of the first distance a and the second distance b is the right direction (Yes of S40), the torque timing determination unit 142 and the torque determination unit 144 may respectively send a corrected torque timing $t2=t1\pm t'$ and a corrected torque $\Psi 2=\Psi 1\pm\Psi'$, which are respectively obtained by correcting the initial torque timing t1 and the initial torque $\Psi 1$, to the steering controller 150 (S50 and S60).

The aforementioned method may be implemented as computer-readable code stored in a computer-readable recording medium. The computer-readable recording medium includes all kinds of recording media storing data readable by a computer system. Examples of the computer-readable recording medium include a ROM, a RAM, a magnetic tape, a magnetic disk, a flash memory, an optical data storage device and the like. In addition, the computer-readable recording medium may be distributed to computer systems connected through a computer communication network, stored and executed as code readable in a distributed manner.

Although aspects of the present disclosure have been described herein for illustrative purposes, those skilled in the art will appreciate that various modifications, additions and substitutions are possible, without departing from essential characteristics of the disclosure. Thus, embodiments disclosed herein are only exemplary and not to be considered as limitative of the disclosure. Accordingly, the scope of the disclosure is not to be limited by the above aspects but by the claims and equivalents thereof.

What is claimed is:

1. A lane keeping assist/support (LKAS) system for preventing lane departure of a vehicle, comprising:
   an LKAS controller determining whether an adjacent vehicle is present by analyzing around-view images of the vehicle acquired by an around-view monitoring (AVM) system installed in the vehicle;
   a vehicle position calculator calculating a position of the vehicle;
   an adjacent vehicle position calculator calculating a position of the adjacent vehicle when the adjacent vehicle is determined to be present;
   a torque controller determining whether a proximity index generated according to the calculated position of the vehicle and the calculated position of the adjacent vehicle is less than a threshold value and correcting an initial torque timing and an initial torque based on the calculated position of the vehicle when the proximity index is determined to be less than the threshold value; and
   a steering apparatus controlling steering of the vehicle according to the corrected initial torque timing and the corrected initial torque,
   wherein the torque controller receives a relative vertical distance of the adjacent vehicle with respect to the vehicle from the adjacent vehicle position calculator,
   wherein the torque controller advances the initial torque timing and increases the initial torque if the relative vertical distance is a positive value, and
   wherein the torque controller delays the initial torque timing and decreases the initial torque if the relative vertical distance is a negative value.

2. The LKAS system according to claim 1, wherein the vehicle position calculator calculates the position of the vehicle by analyzing a photographed front view image showing a front view of the vehicle.

3. The LKAS system according to claim 1, wherein the adjacent vehicle position calculator calculates the position of the adjacent vehicle by analyzing the around-view images acquired by the AVM system.

4. The LKAS system according to claim 1, wherein:
the position of the vehicle includes a first distance between a center of the vehicle and a left lane and a second distance between the center of the vehicle and a right lane, and
the position of the adjacent vehicle includes at least one of a third distance corresponding to a horizontal distance between the vehicle and a left adjacent vehicle and a fourth distance corresponding to a horizontal distance between the vehicle and a right adjacent vehicle.

5. The LKAS system according to claim 4, wherein:
the proximity index includes a first proximity index and a second proximity index, and
the torque controller generates the first proximity index by subtracting the first distance from the third distance and generates the second proximity index by subtracting the second distance from the fourth distance.

6. The LKAS system according to claim 5, wherein the torque controller corrects the initial torque timing and the initial torque based on the position of the vehicle using a timing correction value and a torque correction value determined according to the first proximity index when the first proximity index is less than a first threshold value.

7. The LKAS system according to claim 6, wherein the torque controller increases or decreases the initial torque timing and the initial torque according to the timing correction value and the torque correction value on the basis of the relative vertical distance generated by analyzing the around-view images.

8. The LKAS system according to claim 5, wherein the torque controller corrects the initial torque timing and the initial torque based on the position of the vehicle using a timing correction value and a torque correction value determined according to the second proximity index when the second proximity index is less than a second threshold value.

9. A vehicle, comprising:
an AVM system configured to acquire around-view images of the vehicle;
an LKAS controller determining whether an adjacent vehicle is present by analyzing the around-view images of the vehicle acquired by the AVS system;
a vehicle position calculator calculating a position of the vehicle;
an adjacent vehicle position calculator calculating a position of the adjacent vehicle when the adjacent vehicle is determined to be present;
a torque controller determining whether a proximity index generated according to the calculated position of the vehicle and the calculated position of the adjacent vehicle is less than a threshold value and correcting an initial torque timing and an initial torque based on the calculated position of the vehicle when the proximity index is determined to be less than the threshold value; and
a steering apparatus controlling steering of the vehicle according to the corrected initial torque timing and the corrected initial torque,
wherein the torque controller receives a relative vertical distance of the adjacent vehicle with respect to the vehicle from the adjacent vehicle position calculator,
wherein the torque controller advances the initial torque timing and increases the initial torque if the relative vertical distance is a positive value, and
wherein the torque controller delays the initial torque timing and decreases the initial torque if the relative vertical distance is a negative value.

10. A method of controlling an LKAS system for preventing lane departure of a vehicle, comprising:
determining whether an adjacent vehicle is present by analyzing around-view images of the vehicle acquired by an AVM system installed in the vehicle;
calculating a position of the vehicle;
calculating a position of the adjacent vehicle when the adjacent vehicle is determined to be present;
determining whether a proximity index generated according to the calculated position of the vehicle and the calculated position of the adjacent vehicle is less than a threshold value;
correcting an initial torque timing and an initial torque based on the calculated position of the vehicle when the proximity index is determined to be less than the threshold value; and
controlling steering of the vehicle according to the corrected initial torque timing and the corrected initial torque,
wherein the initial torque timing is advanced and the initial torque is increased when a relative vertical distance between the adjacent vehicle and the vehicle is a positive value, and
wherein the initial torque timing is delayed and the initial torque is decreased when the relative vertical distance between the adjacent vehicle and the vehicle is a negative value.

11. The method according to claim 10, wherein the calculating of the position of the vehicle comprises calculating the position of the vehicle by analyzing a photographed front view image showing a front view of the vehicle.

12. The method according to claim 10, wherein the calculating of the adjacent vehicle comprises calculating the position of the adjacent vehicle by analyzing the around-view images acquired by the AVM system.

13. The method according to claim 10, wherein:
the position of the vehicle includes a first distance between a center of the vehicle and a left lane and a second distance between the center of the vehicle and a right lane, and
the position of the adjacent vehicle includes at least one of a third distance corresponding to a horizontal distance between the vehicle and a left adjacent vehicle and a fourth distance corresponding to a horizontal distance between the vehicle and a right adjacent vehicle.

14. The method according to claim 13, wherein:
the proximity index includes a first proximity index and a second proximity index, and
the determining whether the proximity index is less than the threshold value comprises generating the first proximity index by subtracting the first distance from the third distance and generating the second proximity index by subtracting the second distance from the fourth distance.

15. The method according to claim 14, wherein the correcting of the initial torque timing and the initial torque comprises correcting the initial torque timing and the initial torque based on the position of the vehicle using a timing correction value and a torque correction value determined according to the first proximity index when the first proximity index is less than a first threshold value.

16. The method according to claim 15, wherein the initial torque timing and the initial torque are increased or decreased according to the timing correction value and the torque correction value on the basis of the relative vertical distance generated by analyzing the around-view images.

17. The method according to claim 14, wherein the correcting of the initial torque timing and the initial torque comprises correcting the initial torque timing and the initial torque based on the position of the vehicle using a timing correction value and a torque correction value determined according to the second proximity index when the second proximity index is less than a second threshold value.

* * * * *